United States Patent [19]

Metcalf

[11] 4,366,373

[45] Dec. 28, 1982

[54] EVENT RATE COUNTER

[75] Inventor: Wilbur F. Metcalf, Sarasota, Fla.

[73] Assignee: Electro Corporation, Sarasota, Fla.

[21] Appl. No.: 196,592

[22] Filed: Oct. 14, 1980

[51] Int. Cl.$^3$ ............................................. G01P 3/48
[52] U.S. Cl. ........................ 235/92 DM; 235/92 FQ; 235/92 TF; 324/160; 324/166; 364/767
[58] Field of Search ........ 235/92 DM, 92 CP, 92 TF, 235/92 FQ; 324/160, 166, 178, 173; 364/703, 754, 761, 767

[56] References Cited

U.S. PATENT DOCUMENTS

| | | | |
|---|---|---|---|
| 3,525,044 | 8/1970 | Richmond | 235/92 FQ |
| 3,729,996 | 5/1973 | Metz | 235/92 DM |
| 3,748,533 | 7/1973 | South | 324/166 |
| 3,764,784 | 10/1973 | Haner | 235/92 DM |
| 3,840,724 | 10/1974 | Tripp | 235/92 DM |
| 3,991,368 | 11/1976 | Powell | 235/92 FQ |
| 4,031,466 | 6/1977 | Krause | 324/166 |
| 4,074,196 | 2/1978 | Webster | 235/92 FQ |
| 4,086,532 | 4/1978 | Aronson | 324/166 |
| 4,125,295 | 11/1978 | Ruhnau | 235/92 TF |
| 4,199,719 | 4/1980 | Grob | 324/166 |

Primary Examiner—Howard Britton
Attorney, Agent, or Firm—Wegner, McCord, Wood & Dalton

[57] ABSTRACT

An event rate counter for measuring the number of events occurring per unit of time with an input pulse train having a fixed number of pulses per each occurrence of the event, wherein the input pulse train is scaled by a multiplier and divider to provide a direct readout in events-per-unit of time. The input pulse train is amplified and applied to a level detector, the output of which is a logic level pulse train having frequency equal to the frequency of the input signal. The pulse train frequency is monitored by a frequency detector for controlling a commutative switch. For low frequency pulse trains, the switch gates the pulse train from the level detector first to the multiplier, the output of which is gated by the switch to the divider. The multiply-divide sequence order is reversed by the switch for high frequency pulse trains thereby extending the dynamic frequency range of the counter.

17 Claims, 2 Drawing Figures

EVENT RATE COUNTER

BACKGROUND OF THE INVENTION

This invention relates to an event rate counter for measuring the number of events occurring per unit of time having automatic switching so that the order of a multiply-divide scaling sequence for high frequency pulse trains is the reverse of the sequence order for low frequency pulse trains.

Event rate counters in the form of digital tachometers have been known in which a pulse train is derived from a rotating gear having N teeth, the frequency of which is scaled to provide a direct reading in revolutions-per-minute. However, the dynamic frequency range of such tachometers is limited by the order in which scaling by multiplication and division occurs. Further problems arise from ineffective noise discrimination of the input sensor signal resulting in erroneous speed indications.

SUMMARY OF THE INVENTION

In accordance with the present invention, the disadvantages of prior event rate counters as discussed above have been overcome.

The event rate counter receives an input pulse train having frequency equal to $(N \times E/T \div X)$ Hz where N represents pulses-per-event, E/T represents events-per-unit of time and X represents seconds-per-unit of time. The input pulse train is scaled by a multiply-by-X circuit and a divide-by-N circuit so that a one-second sample of the scaled pulse train provides a direct readout in events-per-unit of time.

The input pulse train is applied to an amplifier having an optimum signal to noise ratio. The amplified pulse train is input to a level detector providing the required noise discrimination. The level detector outputs a logic level pulse train, the frequency of which is equal to the frequency of the input pulse train.

A frequency detector monitors the pulse train frequency and outputs a switching command to control a commutative switch. For low frequency pulse trains, the switch gates the logic level pulse train first to the multiply-by-X circuit, the output of which is then gated by the switch to the divide-by-N circuit. When the frequency of the pulse train is high, the switching command output from the frequency detector causes the switch to gate the pulse train first to the divider and then to the multiplier. The reversal of the multiply-divide sequence order for high frequency pulse trains extends the dynamic frequency range of the event rate counter.

The scaled pulse train from the multiply-by-X and divide-by-N circuits is applied to a counter which accumulates a count of the number of pulses occurring during a one-second period. At the end of each one-second period, the accumulated count is latched into a digital display providing a direct readout in events-per-unit of time. The frequency detector and counter are controlled by a clock input so that frequency switching occurs synchronously with the end of the one-second accumulator cycle. The counter is inhibited for a short period of time after frequency switching has occurred to prevent an erroneous count during transient settling of the counter.

Other objects and features of the invention will be apparent from the following description and from the drawings.

SPECIFICATION

Figure 1:
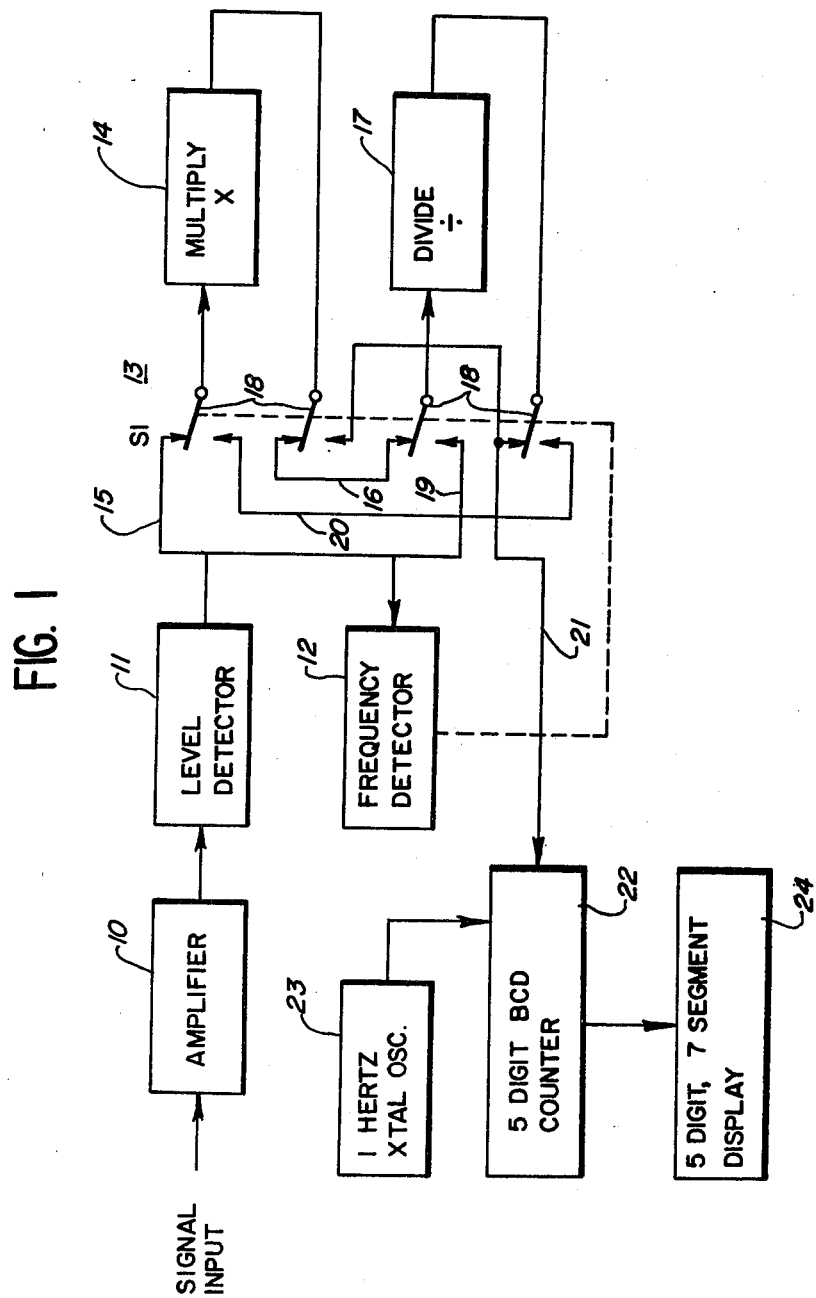
FIG. 1 is a block diagram of the event rate counter.

The event rate counter of the present invention as shown in FIG. 1 provides a direct readout in events-per-unit of time of any measurable quantity for which an input signal having pulses-per-event can be generated. Typical applications include shaft speed, flow rate, production rate and linear measurements having respective readouts in revolutions-per-minute, gallons-per-minute, parts-per-minute and feet-per-minute or seconds.

The frequency of the input pulse train is equal to $(N \times E/T \div X)$ Hz where N represents pulses-per-event, E/T represents events-per-unit of time and X represents seconds-per-unit of time. The input signal is scaled by a factor of X/N so that a one-second sample of the scaled frequency provides a direct readout in events-per-unit of time.

The input pulse train is applied to an amplifier 10 having an optimum signal-to-noise ratio for input signals generated by variable reluctance type sensors. The amplified signal is input to a level detector 11 which establishes a minimum sensitivity for the event rate counter providing required noise discrimination. Level detector 11 outputs a logic level pulse train, the frequency of which is equal to the frequency of the input pulse train.

The frequency of the pulse train from the level detector 11 is monitored by a frequency detector 12, the output of which controls a commutative switch 13. When the frequency of the input pulse train is low, frequency detector 12 produces a switching signal causing switch 13 to assume the position as shown in FIG. 1 whereby the pulse train from level detector 11 is applied to a multiply-by-X circuit 14 through line 15. The product frequency pulse train output from multiplier 14 is then applied through line 16 to a divide-by-N circuit 17, the output of which is a pulse train having frequency equal to (events-per-unit of time) Hz. Where the frequency of the input pulse train is greater than 6 KHz, frequency detector 12 produces a switching command signal to switch 13 causing contacts 18 to assume the opposite position connecting the divider 17 and multiplier 14 inputs to respective lines 19 and 20. In this position, the pulse train from level detector 11 is first applied to the divide-by-N circuit 17 through line 19. The dividend frequency pulse train output from the divider circuit 17 is then applied through line 20 to the multiply-by-X circuit 14.

The purpose of the multiply-divide sequence order reversal is to extend the dynamic frequency range of the instrument. For example, where the multiplier circuit has an input frequency limitation of 1 KHz minimum to 20 KHz maximum and division is always performed before multiplication, then the input frequency required would have to be greater than or equal to N rather than greater than or equal to 1 Hz, the minimum set by the multiplier circuit itself. If multiplication is always performed before division, then the maximum frequency of the input signal would be limited by 20 KHz rather than $N \times 20$ KHz, the maximum limit where division is performed first. The reversal of the multiply-divide sequence thus extends the dynamic frequency range of the event rate counter to a 1 Hz to $N \times 20$ KHz range.

The scaled pulse train produced by the multiplier 14 and divider 17 is transferred through switch 13 on line 21 to a five-digit BCD counter 22. Counter 22 accumulates the number of pulses occurring during a one-second period under the control of a 1 Hz crystal oscillator 23. The accumulated count from counter 22 is latched into a digital display 24 at the end of each one-second period to provide a direct readout in events-per-unit of time.

Figure 2:
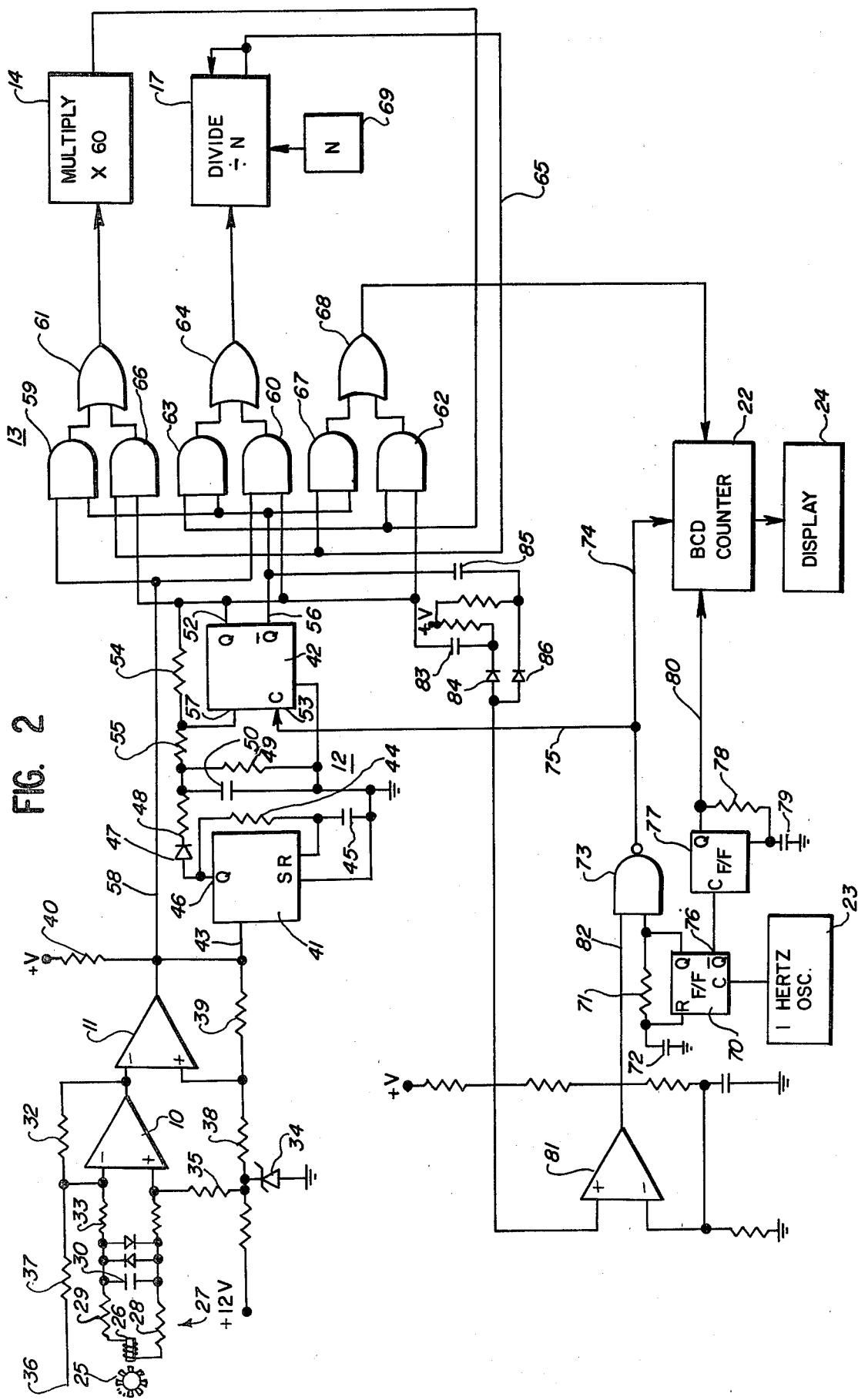
FIG. 2 is a schematic of the event rate counter.

The event rate counter in the form of a digital tachometer for measuring the speed of a rotating shaft will now be described in detail in connection with FIG. 2. A magnetic pick-up unit 25 is activated by an N tooch gear 26 as it rotates, producing an input pulse train, the frequency of which is equal to $(N \times RPM \div 60)$ Hz. This input frequency is scaled by a factor of 60/N so that a one-second sample of the scaled frequency provides a reading of speed in RPM.

The input signal derived from the magnetic pick-up unit 25 is applied to amplifier 10 through a low pass filter 27. The input signal from the magnetic pick-up unit 25 is determined by the rate of change of magnetic flux through the unit's coil and has a voltage/frequency characteristic which is approximately 6 db per octave. The low pass filter 27 consisting of resistors 28 and 29 and a capacitor 30 rolls off at approximately 6 db per octave about 700 Hz providing optimum signal-to-noise ratio without sacrificing low level frequency sensitivity. A resistor 32 establishes a feedback path for amplifier 10, the ratio of resistor 32 to the sum of the resistors 29 and 33 setting the amplifier gain. Resistors 32, 29 and 33 have respective values of 22K ohms ($\Omega$), 2.2K ohms and 2.2K ohms resulting in a gain of 5. The inverting and noninverting input terminals of amplifier 10 are offset by 6 volts from a zener diode reference 34 connected to the noninverting input terminal of amplifier 10 through a resistor 35. Symmetrical limiting of the input signal to amplifier 10 is provided by oppositely poled diodes 36 and 37 connected between the inverting and noninverting input terminals of amplifier 10.

An input terminal 36 is provided for an input pulse train signal when a sensor other than a magnetic pick-up unit is utilized. The input pulse train is applied to the inverting terminal of amplifier 10 through a buffer resistor 37.

The output pulse train from amplifier 10 is applied to the inverting terminal of the level detector 11 configured as a voltage comparator. The noninverting input terminal of level detector 11 is tied to the reference voltage from the zener diode 34 through a resistor 38. Resistors 38, 39 and 40 provide a positive feedback divider network establishing a hysteresis of approximately 150 millivolts at the input of level detector 11. This value taken with the gain of amplifier 10 establishes a 30 millivolt minimum input signal requirement from the magnetic pick-up unit. The output of level detector 11 is a logic level pulse train having a fundamental frequency equal to the fundamental frequency of the input pulse train. The logic level pulse train from level detector 11 is applied to the switching network 13 where it is gated to the multiplier 14 and divider 17, in the order determined by the switching command from frequency detector 12.

Frequency detector 12 includes two flip-flops 41 and 42. Flip-flop 41 is a one-shot multivibrator triggered by the output from level detector 11 on line 43. Flip-flop 41 produces a pulse train, each pulse of which has a fixed width determined by a resistor 44 and a capacitor 45. As the input frequency of the pulse train from level detector 11 increases, the ratio of on-time to off-time at the output terminal 46 of flip-flop 41 increases, thereby increasing the average DC component of the pulse train. The output pulse train from flip-flop 41 is passed through a diode 47 to a low pass filter comprised of resistors 48 and 49 and a capacitor 50. The average DC component of the pulse train is extracted by the low pass filter and is applied to an input terminal 51 of flip-flop 42.

Flip-flop 42 of the frequency detector 12 produces an output signal at terminal 52 and the inverse of that signal at terminal 56 providing the switching command to switch 13. When the frequency of the input pulse train is such that the voltage level at terminal 51 is above the threshold level of flip-flop 42, set at approximately 6 volts, the output signal at terminal 52 is high whereas, the inverted output at terminal 56 is low indicating multiplication is to be performed before division. For a pulse train having a low frequency that is less than 6 KHz, the output signal at terminal 52 will be low, whereas terminal 56 will be high indicating division is to be performed before multiplication.

Switch 13 gates the logic level pulse train from level detector 11 on line 58 to the multiplier 14 and the divider 16 for scaling in the order determined by the switching command from flip-flop 42. The pulse train from the level detector 11 is input to AND gates 59 and 60. AND gates 59 receives a second input from the inverted output terminal 56, AND gate 60 receiving a second input from the output terminal 52.

As described above for a low frequency input pulse train, the output terminal 52 will be low inhibiting AND gate 60. However, the inverted output terminal 56 is high gating AND gate 59 to pass the pulse train from level detector 11 on line 58 to the multiplier 14 through an OR gate 61. The output of multiplier 14 is a pulse train having frequency equal to the product of 60 times the frequency of the input pulse train. The product frequency pulse train from multiplier 14 is applied to AND gates 62 and 63, AND gate 62 being inhibited by the low output signal from terminal 52. AND gate 63 is gated by the high inverted output signal from terminal 56 to pass the product pulse train to the divider 17 through an OR gate 64. Divider 17 divides the frequency of the pulse train by N, the number of gear teeth, to provide the scaled pulse train. The scaled pulse train from divider 17 is applied on line 65 to AND gates 66 and 67, AND gates 66 being inhibited from passing the scale pulse train by the low output signal from terminal 52. AND gate 67 receives its second input signal from terminal 56 of flip-flop 42, the output of which is high allowing the scaled pulse train to pass to the BCD counter 22 through an OR gate 68.

For a high frequency pulse train of approximately 6 KHz, flip-flop 42 changes states such that the output signal at terminal 52 is high whereas the inverted output signal at terminal 56 is low. The high output signal at terminal 52 gates AND gate 60 to pass the input pulse train from the level detector 11 through OR gate 64 to the divider 17. AND gates 59, 63 and 67 are inhibited by the low inverted output signal from terminal 56 of flip-flop 42. The dividend frequency pulse train output from divider 17 is applied to AND gates 66 and 67, only AND gate 66 being gated to pass the divided pulse train to the multiplier circuit 14 through OR gate 61. Multiplier 14 multiplies the frequency of the dividend frequency pulse train by 60, the output of which passes through AND gate 62 of switch 13 and OR gate 68 to the BCD counter 22.

Multiplier 14 consists of a phase lock loop and a divide-by-60 circuit. The phase lock loop forces a voltage controlled oscillator up or down until its output has a frequency equal to 60 times the frequency of the pulse train input to the multiplier. Divider 17 is a counter set to the value of N by a three-digit thumbwheel switch 69. Upon receipt of each pulse from switch 13 the counter is decremented by 1. When a zero count is reached, an output pulse is produced on line 65 resetting divider 17 to N so that the counter continues to count down upon receipt of the next input pulse. Divider 17 thus produces an output pulse train having frequency equal to the frequency of the pulse train input to the divider divided by N.

The time base crystal oscillator 23 clocks the flip-flop 42 of the frequency detector 12 and also the BCD counter 22. Oscillator 23 produces a 1 Hz signal coupled to the clock input of a flip-flop 70 configured as a one-shot multivibrator. Flip-flop 70 outputs a latch enable signal having a 1 microsecond pulse width established by a resistor 71 and a capacitor 72 to a NAND gate 73. The output from NAND gate 73 is applied to a latch enable input to the BCD counter on line 74. Upon receipt of the latch enable signal from NAND gate 73, the accumulated pulse count in counter 22 is latched into the display 24 once each second providing a reading of speed in RPM. The latch enable signal from NAND gate 73 is also connected to the clock input of flip-flop 42 of frequency detector 12 so that the switching command occurs synchronously with the end of the one-second accumulator cycle.

The inverted output terminal 76 of flip-flop 70 is connected to the clock input of a second flip-flop 77, the output of which is a pulse having a width of one microsecond established by a resistor 78 and a capacitor 79. The output pulse from flip-flop 77 on line 80 starts coincident with the end of the latch enable pulse from flip-flop 70 and is connected to a reset terminal of counter 22 so that as soon as the accumulated count is latched out to the display 24, counter 22 is reset to zero and begins accumulating the pulses input from the multiply-divide circuit for another one-second period.

To prevent an erroneous count from accumulating in counter 22 during transient settling of the event rate counter after frequency switching has occurred, an amplifier 81 configured as a 1.5-second one-shot is coupled to the second input terminal of NAND gate 73 on line 82. When frequency switching takes place at flip-flop 42, amplifier 81 is pulled low through a capacitor 83 and a diode 84 or through a capacitor 85 and diode 86. This causes the amplifier 81 to produce a 1.5-second pulse inhibiting NAND gate 73 from gating the latch enable pulse from flip-flop 70 to the BCD counter 22.

I claim:

1. In an event rate counter for measuring the number of events occurring per unit of time with an input pulse train having a fixed number of pulses per each occurrence of said event and having a frequency related to the frequency of occurrence of said event, said pulse train scaled by a multiplier means and a divider means for providing a direct readout in events-per-unit of time, an improved automatic switching means for determining the sequential order in which the pulse train is applied to the multiplier means and the divider means comprising:

frequency detector means for determining whether the frequency of the input pulse train is greater than or less than a reference frequency; and switching means for routing said pulse train to the multiplier means if the input pulse train frequency is less than the reference frequency and routing said pulse train to the divider means if the input pulse train frequency is greater than the reference frequency.

2. The event rate counter of claim 1 wherein the frequency detector means includes:

means for developing an average DC component proportional to the frequency of the input pulse train; and means for comparing said average DC component to a threshold voltage for determining whether said pulse train frequency is greater than the reference frequency.

3. The event rate counter of claim 2 wherein means for developing an average DC component includes:

means triggered by the input pulse train for developing a second pulse train, having a fixed pulse width and a frequency proportional to the input train frequency; and means for extracting the average DC component of said second pulse train to be applied to the comparing means.

4. The event rate counter of claim 1 wherein the switching means further includes means for routing the output of the multiplier means to the divider means to produce the scaled pulse train if the frequency of the input pulse train is less than the reference frequency.

5. The event rate counter of claim 4 wherein the switching means further includes means for routing the scaled pulse train output from the divider means to a counter for accumulating the number of pulses of said scaled pulse train occurring during a fixed period of time.

6. The event rate counter of claim 1 wherein the switching means further includes means for routing the output of the divider means to the multiplier means to produce the scaled pulse train if the frequency of the input pulse trains is greater than the reference frequency.

7. The event rate counter of claim 6 wherein the switching means further includes means for routing the scaled pulse train output from the multiplier means to a counter for accumulating the number of pulses of said scaled pulse train occurring during a fixed period of time.

8. In an event rate counter for measuring the number of events occurring per unit of time with an input pulse train having a fixed number of pulses per each occurrence of said event and having a frequency related to the frequency of occurrence of said event, said pulse train scaled by a multiplier means and a divider means for providing a direct readout in events-per-unit of time, an improved automatic switching means for determining the sequential order in which the pulse train is applied to the multiplier means and the divider means comprising:

frequency detector means for monitoring the frequency of the input pulse train to produce a first switching command signal for low frequency pulse trains wherein the pulse train frequency is less than a reference frequency and a second switching command signal for high frequency pulse trains wherein the pulse train frequency is greater than said reference frequency; and switching means for gating said pulse train to the multiplier means for frequency multiplication and the dividing means for frequency division under the control of said first and second switching command signals.

9. The event rate counter of claim 8 wherein the switching means includes a first set of gates enabled by the first switching command signal for low frequency pulse trains to pass said pulse train to the multiplier means and thereafter to the divider means.

10. The event rate counter of claim 9 further including a second set of grades enabled by the second switching command signal for high frequency pulse trains to pass the pulse train to the divider means and thereafter to said multiplier means, said first set of gates being inhibited by said second switching command signal.

11. The event rate counter of claim 10 wherein the first set of gates are further enabled by the first switching command signal to pass the scaled pulse train output from the divider means to a counter for accumulating the number of pulses of said scaled pulse train occurring during a fixed period of time, said second set of gates enabled by the second switching command signal to pass the scaled pulse trains output from the multiplier means to said counter.

12. The event rate counter of claim 11 further including means to enable the frequency detector to produce the first and second switching command signals synchronously with the end of said fixed period of time.

13. The event rate counter of claim 11 further including means to inhibit the counter during transient settling of the counter when the output of the frequency detector means changes from the first to the second switching command signal or from the second to the first switching command signal.

14. In a digital tachometer for measuring the rotational speed on an N tooth gear with an input pulse train derived from said gear having frequency related to gear speed, said pulse train scaled by a multiplier and a divider for providing a direct readout of speed in events-per-unit of time, an improved automatic switching means for determining the sequential order in which multiplication and division are to be performed comprising:

noise discrimination means for providing a logic level pulse train having frequency equal to the frequency of the input pulse train;

frequency detector means for determining whether the frequency of the input pulse train is greater than or less than a reference frequency; and switching means for routing the logic level pulse train to the multiplier means and thereafter to the divider means if the input pulse train frequency is less than the reference frequency and routing said logic level pulse train to the divider means and thereafter to the multiplier means if the input pulse train frequency is greater than the reference frequency.

15. The digital tachometer of claim 14 wherein the noise discrimination means includes a level detector for comparing the level of the input pulse train with a reference level to produce the logic level pulse train only when the input pulse train level exceeds the reference level.

16. The digital tachometer of claim 14 wherein the noise discrimination means further includes input means having an optimum signal-to-noise ratio for input signals generated by a variable reluctance type sensor.

17. The digital tachometer of claim 14 further including a counter for accumulating the number of pulses of the scaled pulse train occurring during a one-second period wherein the multiplier multiplies the pulse train frequency by 60 and the divider divides the pulse train frequency by N to provide a direct readout of speed in revolutions per minute.

* * * * *